United States Patent
Zhang et al.

(10) Patent No.: US 10,517,038 B2
(45) Date of Patent: *Dec. 24, 2019

(54) METHOD AND DEVICE FOR GENERATING ACCESS POINT ATTRIBUTE INFORMATION OF WIRELESS ACCESS POINT

(71) Applicant: SHANGHAI LIANSHANG NETWORK TECHNOLOGY CO., LTD., Shanghai (CN)

(72) Inventors: Fayou Zhang, Shanghai (CN); Yingjun Zhao, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,846

(22) Filed: Feb. 2, 2018

(65) Prior Publication Data
US 2018/0160365 A1    Jun. 7, 2018

Related U.S. Application Data

(63) Continuation of application No. PCT/CN2016/070673, filed on Jan. 12, 2016.

(30) Foreign Application Priority Data

Aug. 3, 2015 (CN) .......................... 2015 1 0469069

(51) Int. Cl.
*H04W 48/16* (2009.01)
*H04W 48/14* (2009.01)
(Continued)

(52) U.S. Cl.
CPC .......... *H04W 48/16* (2013.01); *H04W 48/14* (2013.01); *H04W 48/17* (2013.01); *H04W 48/20* (2013.01); *H04W 84/12* (2013.01)

(58) Field of Classification Search
CPC ..... H04W 48/16; H04W 48/14; H04W 48/20; H04W 48/17
See application file for complete search history.

(56) References Cited

U.S. PATENT DOCUMENTS 9,622,081 B1 * 4/2017 Satish .................... H04W 12/10
10,187,327 B2 * 1/2019 Gamal .................. H04L 47/823
(Continued)

FOREIGN PATENT DOCUMENTS

CN    102572736 A    7/2012
CN    104025635 A    9/2014
(Continued)

*Primary Examiner* — Asghar H Bilgrami
(74) *Attorney, Agent, or Firm* — Kilpatrick Townsend & Stockton, LLP (57) ABSTRACT

A method and device for generating access point attribute information about a wireless access point is provided. The method includes obtaining an attribute operation by a user on a wireless access point, and determining access point attribute information about the wireless access point according to the attribute operation. Based on an attribute operation submitted by UGC of a large number of users on a wireless access point, and then by determining access point attribute information about the wireless access point according to the attribute operation, such as an acceptation/correction/complaint operation on an attribute of an access point, lots of accurate and reliable access point attribute information can be automatically accumulated, without the work of collecting the access point attribute information offline in a labor-consuming and time-consuming manner, constructing, without any costs, an accurate, comprehensive and valuable vast-hotpot-information library for big data mining, and enhancing the user experience.

10 Claims, 2 Drawing Sheets

(51) Int. Cl.
*H04W 48/20* (2009.01)
*H04W 48/00* (2009.01)
*H04W 84/12* (2009.01)

(56) References Cited

U.S. PATENT DOCUMENTS

| | | | |
|---|---|---|---|
| 2007/0167174 A1 | 7/2007 | Halcrow et al. | |
| 2012/0265996 A1* | 10/2012 | Kaal | H04L 63/102 713/182 |
| 2012/0315901 A1* | 12/2012 | Un | H04W 4/04 455/435.1 |
| 2013/0040603 A1* | 2/2013 | Stahlberg | H04L 63/126 455/410 |
| 2013/0097710 A1* | 4/2013 | Basavapatna | H04W 4/02 726/25 |
| 2016/0295372 A1* | 10/2016 | Kapicioglu | H04W 64/00 |
| 2018/0152883 A1* | 5/2018 | Fang | H04W 48/16 |

FOREIGN PATENT DOCUMENTS

| | | |
|---|---|---|
| CN | 104219668 A | 12/2014 |
| CN | 104486839 A | 4/2015 |
| CN | 104768156 A | 7/2015 |
| WO | 2014025822 A2 | 2/2014 |

\* cited by examiner

METHOD AND DEVICE FOR GENERATING ACCESS POINT ATTRIBUTE INFORMATION OF WIRELESS ACCESS POINT

CROSS-REFERENCES TO RELATED APPLICATIONS

This application is a continuation of International Application No. PCT/CN2016/070673, filed on Jan. 12, 2016, which claims priority to Chinese Patent Application No. 201510469069.3, filed on Aug. 3, 2015. The disclosures of the aforementioned applications are hereby incorporated by reference in their entireties.

TECHNICAL FIELD

The present application relates to the field of computers, and in particular to a method and device for generating access point attribute information about a wireless access point.

BACKGROUND ART

At present, information about a wireless access point generally obtained by a terminal, such as hotspot information, only comprises information such as SSID and MAC, and lacks other more detailed attribute information about the wireless access point, such as whether it is secure, a commercial tenant name to which it belongs, a commercial tenant category to which it belongs, and these pieces of more detained attribute information are very helpful for a user to select a wireless access point, while the workload is too heavy if these pieces of information are to be collected offline. Therefore, there is an urgent need for a method and device for conveniently, rapidly and efficiently generating and accumulating access point attribute information about a wireless access point.

SUMMARY OF THE INVENTION

A method and device for generating access point attribute information about a wireless access point, which can automatically accumulate lots of accurate and reliable access point attribute information, for, e.g., further data mining or for reference by a user to be accessed to a wireless access point, without the work of collecting the access point attribute information offline in a labor-consuming and time-consuming manner, thereby constructing, without any costs, an accurate, comprehensive and valuable vast-hotpot-information library for big data mining, and enhancing the user experience using the data in a proper scenario is described.

According to one aspect of the present application, a method for generating access point attribute information about a wireless access point is provided, the method comprising:
obtaining an attribute operation by a user on a wireless access point; and
determining access point attribute information about the wireless access point according to the attribute operation.

Furthermore, in the above-mentioned method, the access point attribute information about each wireless access point comprises various attributes of the wireless access point and a current weight value score corresponding to each of the attributes.

Furthermore, in the above-mentioned method, determining access point attribute information about the wireless access point according to the attribute operation comprises:
if the obtained attribute operation is a user submitting a new attribute of the wireless access point, assigning a pre-set initial current weight value score to the new attribute.

Furthermore, in the above-mentioned method, determining access point attribute information about the wireless access point according to the attribute operation comprises:
if the obtained attribute operation is a user submitting an attribute of the wireless access point that is acceptation information for an existing attribute of the wireless access point, adding a pre-set weight value score to a current weight value score of the existing attribute information to act as a new current weight value score of the existing attribute.

Furthermore, in the above-mentioned method, determining access point attribute information about the wireless access point according to the attribute operation comprises:
if the obtained attribute operation is a user submitting an attribute of the wireless access point that is the same as an existing attribute of the wireless access point, adding a pre-set weight value score to a current weight value score of the existing attribute to act as a new current weight value score of the existing attribute.

Furthermore, in the above-mentioned method, determining access point attribute information about the wireless access point according to the attribute operation comprises:
if the obtained attribute operation is a user submitting an attribute of the wireless access point that is negative information for an existing attribute of the wireless access point, subtracting a pre-set weight value score from a current weight value score of the existing attribute to act as a new current weight value score of the existing attribute.

Furthermore, in the above-mentioned method, determining access point attribute information about the wireless access point according to the attribute operation comprises:
determining a current weight value score of each attribute of the wireless access point according to user attribute data and the attribute operation.

Furthermore, in the above-mentioned method, the user attribute data comprises one or any combination of user credit data, a user contribution frequency and a user contribution degree.

Further, in the above-mentioned method, the method further comprises:
providing the access point attribute information to a user equipment to be accessed to the wireless access point.

Furthermore, the above-mentioned method further comprises, while providing the access point attribute information to a user equipment to be accessed to the wireless access point,
if an attribute of the wireless access point is an attribute relating to security, and a current weight value score of the attribute about security is higher than a pre-set threshold value, providing warning information for the wireless access point to the user.

Furthermore, the above-mentioned method further comprises, while providing the access point attribute information to a user equipment to be accessed to the wireless access point,
if an attribute of the wireless access point is an attribute relating to security, and a current weight value score of the attribute relating to security is higher than a pre-set threshold value, analyzing all attributes of the wireless access point; and If the wireless access point is analyzed to be at risk, providing warning information for the wireless access point to the user.

According to another aspect of the present application, a device for generating access point attribute information about a wireless access point is further provided, and the device comprises:
- a first means for obtaining an attribute operation by a user on a wireless access point; and
- a second means for determining access point attribute information about the wireless access point according to the attribute operation.

Furthermore, in the above-mentioned device, the access point attribute information about each wireless access point comprises various attributes of the wireless access point and a current weight value score corresponding to each of the attributes.

Furthermore, in the above-mentioned device, the second means is used for assigning, if the obtained attribute operation is a user submitting a new attribute of the wireless access point, a pre-set initial current weight value score to the new attribute.

Furthermore, in the above-mentioned device, the second means is used for adding, if the obtained attribute operation is a user submitting an attribute of the wireless access point that is acceptation information for an existing attribute of the wireless access point, a pre-set weight value score to a current weight value score of the existing attribute information to act as a new current weight value score of the existing attribute.

Furthermore, in the above-mentioned device, the second means is used for adding, if the obtained attribute operation is a user submitting an attribute of the wireless access point that is the same as an existing attribute of the wireless access point, a pre-set weight value score to a current weight value score of the existing attribute to act as a new current weight value score of the existing attribute.

Furthermore, in the above-mentioned device, the second means is used for subtracting, if the obtained attribute operation is a user submitting an attribute of the wireless access point that is negative information for an existing attribute of the wireless access point, a pre-set weight value score from a current weight value score of the existing attribute to act as a new current weight value score of the existing attribute.

Furthermore, in the above-mentioned device, the second means is used for determining a current weight value score of each attribute of the wireless access point according to user attribute data and the attribute operation.

Furthermore, in the above-mentioned device, the user attribute data comprises one or any combination of user credit data, a user contribution frequency and a user contribution degree.

Furthermore, in the above-mentioned device, the device further comprises:
- a third means for providing the access point attribute information to a user equipment to be accessed to the wireless access point.

Furthermore, in the above-mentioned device, the third means is further used for providing, while providing the access point attribute information to a user equipment to be accessed to the wireless access point, warning information for the wireless access point to the user if an attribute of the wireless access point is an attribute relating to security and a current weight value score of the attribute relating to security is higher than a pre-set threshold value.

Furthermore, in the above-mentioned device, the third means is further used for analyzing, while providing the access point attribute information to a user equipment to be accessed to the wireless access point, all attributes of the wireless access point if an attribute of the wireless access point is an attribute relating to security and a current weight value score of the attribute relating to security is higher than a pre-set threshold value, and providing warning information for the wireless access point to the user if the wireless access point is analyzed to be at risk.

Compared to the prior art, the present application involves obtaining an attribute operation by a user on a wireless access point and determining access point attribute information about the wireless access point according to the attribute operation, so that lots of accurate and reliable access point attribute information can be automatically accumulated based on an attribute operation submitted by UGC of a large number of users on a wireless access point, and then by determining the access point attribute information about the wireless access point according to the attribute operation, such as an acceptation/correction/complaint operation on an attribute of a access point, for further data mining or for reference by a user to be accessed to a wireless access point, without the work of collecting the access point attribute information offline in a labor-consuming and time-consuming manner, thereby constructing, without any costs, an accurate, comprehensive and valuable vast-hotpot-information library for big data mining, and enhancing the user experience using the data in a proper scenario.

Furthermore, in the present application, the access point attribute information about each wireless access point comprises various attributes of the wireless access point and a current weight value score corresponding to each of the attributes. The access point attribute information about each wireless access point can be quantified by means of the various attributes of the wireless access point and the current weight value score corresponding to each of the attributes, so that a user who queries wireless access points can more efficiently distinguish, according to the current weight value score corresponding to each of the attributes, whether the wireless access point is more or less preferred than the other wireless access points.

BRIEF DESCRIPTION OF THE ACCOMPANYING DRAWINGS

By reading the following detailed description made with reference to the drawings for non-limiting embodiments, the other features of the present application will become more apparent.

In the drawings, the same or similar reference signs represent the same or similar components.

DETAILED DESCRIPTION OF THE EMBODIMENTS

The present invention is hereinafter further described in detail in conjunction with the accompanying drawings.

In a typical configuration of the present application, a terminal, a device of a service network and a trustable party all include one or more processors (CPUs), an input/output interface, a network interface and a memory.

The memory may include a non-permanent memory, a random access memory (RAM) and/or a non-volatile memory (such as a read-only memory (ROM) or a flash memory (flash RAM)) and so on in a computer-readable medium. A memory is an example of a computer-readable medium.

A computer-readable medium comprises permanent and non-permanent, movable and non-movable media and may realize information storage by means of any method or technology. The information may be a computer-readable instruction, a data structure, a program module or other data. The examples of a computer storage medium include but are not limited to a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and carrier.

Figure 1:
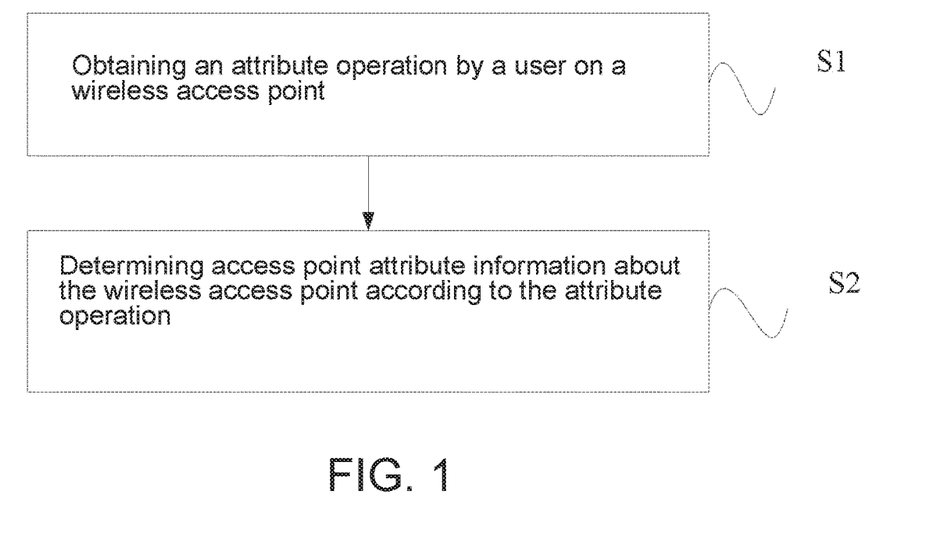
FIG. 1 shows a flowchart of a method for generating access point attribute information about a wireless access point according to one aspect of the present application.

As shown in FIG. 1, the present application provides a method for generating access point attribute information about a wireless access point, and the method comprises:

step S1, obtaining an attribute operation by a user on a wireless access point; here, the attribute operation comprises but is not limited to: a browsing operation, a comment operation or a submission operation by the user on the access point attribute information about the wireless access point, for example, after the user connects to a wireless access point via a client, the user may be guided to supplement attribute information about this wireless access point by means of an attribute operation, such as a commercial tenant name and a commercial tenant category to which it belongs, so that attribute information about each wireless access point is corrected and perfected by contributing knowledge data of the wireless access point by the user, and finally the attribute information about the wireless access point is accumulated based on the attribute operation submitted by UGC (User Generated Content) of a large number of users on the wireless access point; and step S2, determining access point attribute information about the wireless access point according to the attribute operation. Here, the access point attribute information comprises but is not limited to: access point provider information, such as information about a commercial tenant name, a commercial tenant category and a commercial tenant comment, and access point availability information, such as information about the stability, a bandwidth and the security of the access point. Here, based on an attribute operation submitted by UGC of a large number of users on a wireless access point, and then by means of determining access point attribute information about the wireless access point according to the attribute operation, such as an acceptation/correction/complaint operation on an attribute of an access point, lots of accurate and reliable access point attribute information can be automatically accumulated, for further data mining or for reference by a user to be accessed to a wireless access point, without the work of collecting the access point attribute information offline in a labor-consuming and time-consuming manner, thereby constructing, without any costs, an accurate, comprehensive and valuable vast-hotpot-information library for big data mining, and enhancing the user experience using the data in a proper scenario.

In an embodiment of the method for generating access point attribute information about a wireless access point in the present application, the access point attribute information about each wireless access point comprises various attributes of the wireless access point and a current weight value score corresponding to each of the attributes. For example, if the access point attribute information comprises a commercial tenant name, then there may be three different pieces of access point attribute information as shown in Table 1 below,

TABLE 1

| No. | Attribute | Current weight value score |
|---|---|---|
| 1 | Hospital | 20 |
| 2 | Shopping mall | 11 |
| 3 | School | 25 |

Here, the access point attribute information about each wireless access point can be quantified by means of the various attributes of the wireless access point and the current weight value score corresponding to each of the attributes, so that a user who queries wireless access points can more efficiently distinguish, according to the current weight value score corresponding to each of the attributes, whether the wireless access point is more or less preferred than the other wireless access points. Here, comprehensive scoring of big data mining may be performed on an attribute operation by the user on the wireless access point at a cloud end to obtain a current weight value score corresponding to each of the attributes, so as to accumulate access point attribute information about the wireless access point by utilizing knowledge data of the user, i.e., the attribute operation on the wireless access point. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the method for generating access point attribute information about a wireless access point in the present application, determining access point attribute information about the wireless access point according to the attribute operation comprises:

if the obtained attribute operation is a user submitting a new attribute of the wireless access point, assigning a pre-set initial current weight value score to the new attribute. Here, every time a wireless access point newly generates a new attribute, a pre-set initial current weight value score may be correspondingly assigned to each new attribute. Since the new attribute appears for the first time, it may also be considered as a new attribute which has not been accepted, and may be assigned with a lower initial current weight value score. For example, as shown in Table 2 below, initial current weight value scores corresponding to three different attributes when they are newly generated are all 1, thereby facilitating a user in more efficiently distinguishing, according to the current weight value score corresponding to each of the attributes, whether the wireless access point is more or less preferred than the other wireless access points, and also facilitating subsequent accumulation on the basis of the current weight value score for each attribute according to an attribute operation by the user on the wireless access point.

TABLE 2

| No. | Attribute | Current weight value score |
| --- | --- | --- |
| 1 | Hospital | 1 |
| 2 | Shopping mall | 1 |
| 3 | School | 1 |

In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the method for generating access point attribute information about a wireless access point in the present application, determining access point attribute information about the wireless access point according to the attribute operation comprises:

if the obtained attribute operation is a user submitting an attribute of the wireless access point that is acceptation information for an existing attribute of the wireless access point, adding a pre-set weight value score to a current weight value score of the existing attribute information to act as a new current weight value score of the existing attribute. Here, if acceptation information for an existing attribute of the wireless access point may be like information for an existing attribute, then it is considered that this existing attribute is proved to be relatively trustable and can be assigned with a higher weight value score. For example, taking the contents in Table 1 above as an example, there are two pieces of like information for the attribute Hospital, and five pieces of like information for the attribute School, and if two points are added for each piece of like information, then three different pieces of access point attribute information as shown in Table 3 below may be obtained on the basis of Table 1,

TABLE 3

| No. | Attribute | Current weight value score |
| --- | --- | --- |
| 1 | Hospital | 24 |
| 2 | Shopping mall | 11 |
| 3 | School | 35 |

A subsequent user may determine, according to a relatively high current weight value score of the attribute School, that the trust degree that the wireless access point is a school is relatively high. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the method for generating access point attribute information about a wireless access point in the present application, determining access point attribute information about the wireless access point according to the attribute operation comprises:

if the obtained attribute operation is a user submitting an attribute of the wireless access point that is the same as an existing attribute of the wireless access point, adding a pre-set weight value score to a current weight value score of the existing attribute to act as a new current weight value score of the existing attribute. For example, a user submits an attribute which is the same as the attribute School in Table 1, then an attribute School may be no longer newly generated at this time, but similar to the scheme for the foregoing acceptation information, and the current weight value score thereof may be added based on the attribute School in Table 1, since the more users that submit an attribute of a wireless access point which is the same as an existing attribute of the wireless access point, the higher the trust degree of this attribute, and a higher current weight value score may be assigned. A subsequent user may determine the trust degree of each attribute directly according to the magnitude of the current weight value score. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the method for generating access point attribute information about a wireless access point in the present application, determining access point attribute information about the wireless access point according to the attribute operation comprises:

if the obtained attribute operation is a user submitting an attribute of the wireless access point that is negative information for an existing attribute of the wireless access point, subtracting a pre-set weight value score from a current weight value score of the existing attribute to act as a new current weight value score of the existing attribute. Here, the negative information may be complaint information for an existing attribute of a wireless access point. For example, taking the current weight value score in Table 3 above as a basis, if a complaint for the attribute Shopping mall in Table 3 submitted by a user is received, it is considered that the attribute Shopping mall is not trustable or doubtable, and the current weight value score may be decreased on the basis of the Shopping mall in Table 3, e.g., subtracting two points for one complaint, then three different pieces of access point attribute information as shown in Table 4 below may be obtained on the basis of Table 3,

TABLE 4

| No. | Attribute | Current weight value score |
| --- | --- | --- |
| 1 | Hospital | 24 |
| 2 | Shopping mall | 9 |
| 3 | School | 35 |

In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

Here, if the obtained attribute operation is that a user browses an existing attribute of the wireless access point and does not submit any acceptation information or negative information for the existing attribute or submit the same attribute, then the current weight value score of the attribute may be kept.

In an embodiment of the method for generating access point attribute information about a wireless access point in the present application, determining access point attribute information about the wireless access point according to the attribute operation comprises:

determining a current weight value score of each attribute of the wireless access point according to user attribute data and the attribute operation. Here, the user attribute data may comprise attribute data such as user credit data, a user contribution frequency and a user contribution degree. Generally, an attribute submitted, accepted or negated by a user with a higher credit, a higher contribution frequency or a higher contribution degree is more trustable and can be given a higher current weight value score, so that more reliable access point attribute information about each wireless access point may be obtained. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

Figure 2:
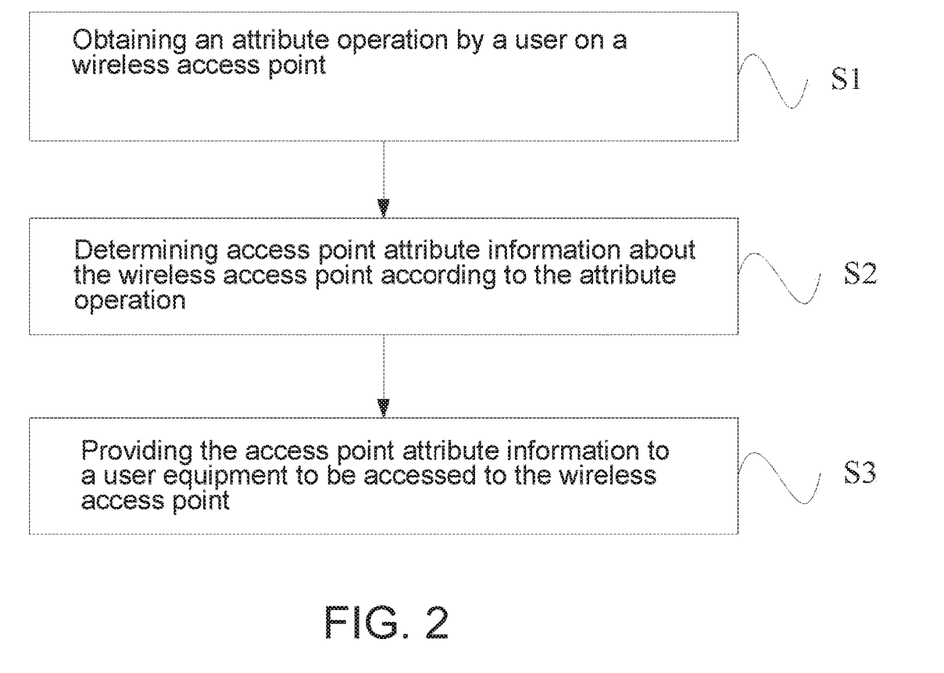
FIG. 2 shows a flowchart of a method for generating access point attribute information about a wireless access point according to an embodiment of the present application.

As shown in FIG. 2, in an embodiment of the method for generating access point attribute information about a wireless access point in the present application, the method further comprises after step S2:

providing the access point attribute information to a user equipment to be accessed to the wireless access point. Here, the user equipment to be accessed to the wireless access point may obtain the wireless access point attribute information, and the user may view attribute information about each wireless access point at the user equipment, e.g., determining which one is a more preferred wireless access point according to each attribute and a current weight value score thereof, so that it is convenient for the user to efficiently and reliably access the wireless access point. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the method for generating access point attribute information about a wireless access point in the present application, the method further comprises, while providing the access point attribute information to a user equipment to be accessed to the wireless access point, if an attribute of the wireless access point is an attribute relating to security, and a current weight value score of the attribute relating to security is higher than a pre-set threshold value, providing warning information for the wireless access point to the user, which is convenient for the user to more easily distinguish those insecure wireless access points. Here, the attribute relating to security may be an attribute named phishing or insecure or the like. For example, a wireless access point has been confirmed as of a phishing hotspot property by a plurality of users by means of an attribute operation on an attribute, then every time one user submits the attribute operation, then one point may be added once for a current weight value score of this attribute, and if there are sufficient users to submit the attribute operation, which causes the current weight value score of the attribute to be increased to be higher than a pre-set threshold value, it indicates that the trust degree that the wireless access point is a phishing hotspot is relatively high, and warning information that the wireless access point is a phishing hotspot may be provided to the user, reminding the user to avoid accessing the wireless access point. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the method for generating access point attribute information about a wireless access point in the present application, the method further comprises, while providing the access point attribute information to a user equipment to be accessed to the wireless access point, if an attribute of the wireless access point is an attribute relating to security, and a current weight value score of the attribute relating to security is higher than a pre-set threshold value, analyzing all attributes of the wireless access point; and if the wireless access point is analyzed to be at risk, providing warning information for the wireless access point to the user. Here, in order to improve the reliability of the obtained result regarding whether a wireless access point is at risk, further comprehensive analysis and determination may be performed on all the attributes of the wireless access point which is preliminary determined to be at risk if a current weight value score of an attribute of the wireless access point is higher than a pre-set threshold value, for example, all the attributes of the wireless access point may be submitted to a cloud end server, and the cloud end server performs further comprehensive analysis and determination on all the attributes of the wireless access point, for example; and if it is further determined that the wireless access point is at risk, then warning information for the wireless access point is provided to the user, so as to ensure that the warning information provided to the user is more reliable. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

Figure 3:
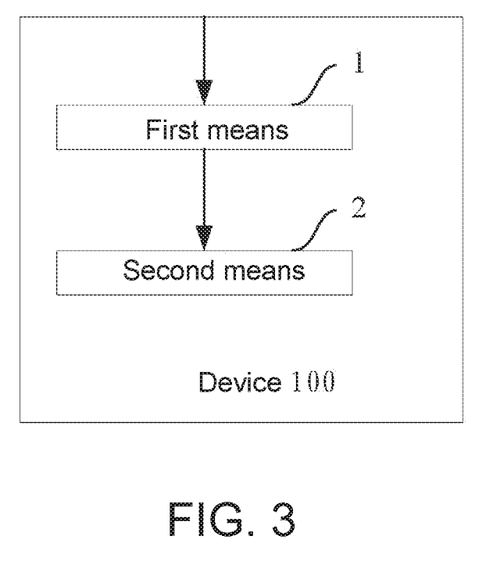
FIG. 3 shows a structural diagram of a device for generating access point attribute information about a wireless access point according to another aspect of the present application.

As shown in FIG. 3, according to another aspect of the present application, a device for generating access point attribute information about a wireless access point is further provided, the device 100 comprising:

a first means 1 for obtaining an attribute operation by a user on a wireless access point; here, the attribute operation comprises but is not limited to: a browsing operation, a comment operation or a submission operation by the user on the access point attribute information about the wireless access point, for example, after the user connects to a wireless access point via a client, the user may be guided to supplement attribute information about this wireless access point by means of an attribute operation, such as a commercial tenant name and a commercial tenant category to which it belongs, so that attribute information about each wireless access point is corrected and perfected by contributing knowledge data of the wireless access point by the user, and finally the attribute information about the wireless access point is accumulated based on the attribute operation submitted by UGC (User Generated Content) of a large number of users on the wireless access point; and a second means 2 for determining access point attribute information about the wireless access point according to the attribute operation. Here, the access point attribute information comprises but is not limited to: access point provider information, such as information about a commercial tenant name, a commercial tenant category and a commercial tenant review, and access point availability information, such as information about the stability, a bandwidth, the security of the access point. Here, based on an attribute operation submitted by UGC of a large number of users on a wireless access point, and then by means of determining access point attribute information about the wireless access point according to the attribute operation, such as an acceptation/correction/complaint operation on an attribute of an access point, lots of accurate and reliable access point attribute information can be automatically accumulated, for further data mining or for reference by a user to be accessed to a wireless access point, without the work of collecting the access point attribute information offline in a labor-consuming and time-consuming manner, thereby constructing, without any costs, an accurate, comprehensive and valuable vast-hotpot-information library for big data mining, and enhancing the user experience using the data in a proper scenario.

In an embodiment of the device for generating access point attribute information about a wireless access point in the present application, the access point attribute information about each wireless access point comprises various attributes of the wireless access point and a current weight value score corresponding to each of the attributes. For example, if the access point attribute information comprises a commercial tenant name, then there may be three different pieces of access point attribute information as shown in Table 1 below,

TABLE 1

| No. | Attribute | Current weight value score |
|---|---|---|
| 1 | Hospital | 20 |
| 2 | Shopping mall | 11 |
| 3 | School | 25 |

Here, Here, the access point attribute information about each wireless access point can be quantified by means of the various attributes of the wireless access point and the current weight value score corresponding to each of the attributes, so that a user who queries wireless access points can more efficiently distinguish, according to the current weight value score corresponding to each of the attributes, whether the wireless access point is more or less preferred than the other wireless access points. Here, comprehensive scoring of big data mining may be performed on an attribute operation by the user on the wireless access point at a cloud end to obtain a current weight value score corresponding to each of the attributes, so as to accumulate access point attribute information about the wireless access point by utilizing knowledge data of the user, i.e., the attribute operation on the wireless access point. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the device for generating access point attribute information about a wireless access point in the present application, the second means 2 is used for assigning, if the obtained attribute operation is a user submitting a new attribute of a wireless access point, a pre-set initial current weight value score to the new attribute. Here, every time a wireless access point newly generates a new attribute, a pre-set initial current weight value score may be correspondingly assigned to each new attribute. Since the new attribute appears for the first time, it may also be considered as a new attribute which has not been accepted, and may be assigned with a lower initial current weight value score. For example, as shown in Table 2 below, initial current weight value scores corresponding to three different attributes when they are newly generated are all 1, thereby facilitating a user in more efficiently distinguishing, according to the current weight value score corresponding to each of the attributes, whether the wireless access point is more or less preferred than the other wireless access points, and also facilitating subsequent accumulation on the basis of the current weight value score for each attribute according to an attribute operation by the user on the wireless access point.

TABLE 2

| No. | Attribute | Current weight value score |
|---|---|---|
| 1 | Hospital | 1 |
| 2 | Shopping mall | 1 |
| 3 | School | 1 |

In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the device for generating access point attribute information about a wireless access point in the present application, the second means 2 is used for adding, if the obtained attribute operation is a user submitting an attribute of a wireless access point that is acceptation information for an existing attribute of the wireless access point, a pre-set weight value score to a current weight value score of the existing attribute information to act as a new current weight value score of the existing attribute. Here, if acceptation information for an existing attribute of the wireless access point may be like information for an existing attribute, then it is considered that this existing attribute is proved to be relatively trustable and can be assigned with a higher weight value score. For example, taking the contents in Table 1 above as an example, there are two pieces of like information for the attribute Hospital, and five pieces of like information for the attribute School, and if two points are added for each piece of like information, then three different pieces of access point attribute information as shown in Table 3 below may be obtained on the basis of Table 1,

TABLE 3

| No. | Attribute | Current weight value score |
|---|---|---|
| 1 | Hospital | 24 |
| 2 | Shopping mall | 11 |
| 3 | School | 35 |

TABLE 4

| No. | Attribute | Current weight value score |
|---|---|---|
| 1 | Hospital | 24 |
| 2 | Shopping mall | 9 |
| 3 | School | 35 |

A subsequent user may determine, according to a relatively high current weight value score of the attribute School, that the trust degree that the wireless access point is a school is relatively high. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the device for generating access point attribute information about a wireless access point in the present application, the second means 2 is used for adding, if the obtained attribute operation is a user submitting an attribute of a wireless access point that is the same as an existing attribute of the wireless access point, a pre-set weight value score from a current weight value score of the existing attribute to act as a new current weight value score of the existing attribute. For example, a user submits an attribute which is the same as the attribute School in Table 1, then an attribute School may be no longer newly generated at this time, but similar to the scheme for the foregoing acceptation information, and the current weight value score thereof may be added based on the attribute School in Table 1, since the more users that submit an attribute of a wireless access point which is the same as an existing attribute of the wireless access point, the higher the trust degree of this attribute, and a higher current weight value score may be assigned. A subsequent user may determine the trust degree of each attribute directly according to the magnitude of the current weight value score. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the device for generating access point attribute information about a wireless access point in the present application, the second means 2 is used for subtracting, if the obtained attribute operation is a user submitting an attribute of a wireless access point that is negative information for an existing attribute of the wireless access point, a pre-set weight value score from a current weight value score of the existing attribute to act as a new current weight value score of the existing attribute. Here, the negative information may be complaint information for an existing attribute of a wireless access point. For example, taking the current weight value score in Table 3 above as a basis, if a complaint for the attribute Shopping mall in Table 3 submitted by a user is received, it is considered that the attribute Shopping mall is not trustable or doubtable, and the current weight value score may be decreased on the basis of the Shopping mall in Table 3, e.g., subtracting two points for one complaint, then three different pieces of access point attribute information as shown in Table 4 below may be obtained on the basis of Table 3, In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

Here, if the obtained attribute operation is that a user browses an existing attribute of a wireless access point and does not submit any acceptation information or negative information for the existing attribute or submit the same attribute, then the current weight value score of the attribute may be kept.

In an embodiment of the device for generating access point attribute information about a wireless access point in the present application, the second means is used for determining a current weight value score of each attribute of the wireless access point according to user attribute data and the attribute operation. Here, the user attribute data may comprise attribute data such as user credit data, a user contribution frequency and a user contribution degree. Generally, an attribute submitted, accepted or negated by a user with a higher credit, a higher contribution frequency or a higher contribution degree is more trustable and can be given a higher current weight value score, so that more reliable access point attribute information about each wireless access point may be obtained. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

Figure 4:
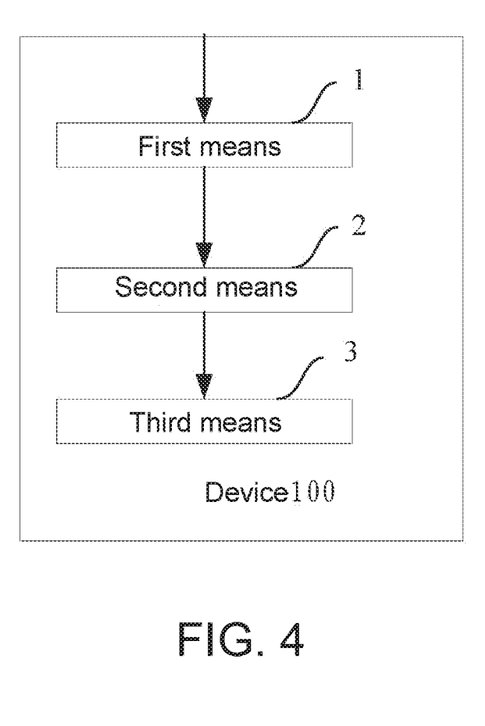
FIG. 4 shows a structural diagram of a device for generating access point attribute information about a wireless access point according to an embodiment of the present application.

As shown in FIG. 4, in an embodiment of the device for generating access point attribute information about a wireless access point in the present application, the device 100 further comprises:

a third means 3 for providing the access point attribute information to a user equipment to be accessed to the wireless access point. Here, the user equipment to be accessed to the wireless access point may obtain the wireless access point attribute information, and the user may view attribute information about each wireless access point at the user equipment, e.g., determining which one is a more preferred wireless access point according to each attribute and a current weight value score thereof, so that it is convenient for the user to efficiently and reliably access the wireless access point. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the device for generating access point attribute information about a wireless access point in the present application, the third means 3 is further used for providing, while providing the access point attribute information to a user equipment to be accessed to the wireless access point, warning information for the wireless access point to the user if an attribute of the wireless access point is an attribute relating to security and a current weight value score of the attribute relating to security is higher than a pre-set threshold value, thereby facilitating the user in more easily distinguishing those insecure wireless access points. Here, the attribute relating to security may be an attribute named phishing or insecure or the like. For example, a wireless access point has been confirmed as of a phishing hotspot property by a plurality of users by means of an attribute operation on an attribute, then every time one user submits the attribute operation, then one point may be added once for the current weight value score of this attribute, and if there are sufficient users to submit the attribute operation, which causes the current weight value score of the attribute to be increased to be higher than a pre-set threshold value, it indicates that the trust degree that the wireless access point is a phishing hotspot is relatively high, and warning information that the wireless access point is a phishing hotspot may be provided to the user, reminding the user to avoid accessing the wireless access point. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In an embodiment of the device for generating access point attribute information about a wireless access point in the present application, the third means 3 is further used for analyzing, while providing the access point attribute information to a user equipment to be accessed to the wireless access point, all attributes of the wireless access point if an attribute of the wireless access point is an attribute relating to security and a current weight value score of the attribute relating to security is higher than a pre-set threshold value, and providing warning information for the wireless access point to the user if the wireless access point is analyzed to be at risk. Here, in order to improve the reliability of the obtained result regarding whether a wireless access point is at risk, further comprehensive analysis and determination may be performed on all the attributes of the wireless access point which is preliminary determined to be at risk if a current weight value score of an attribute of the wireless access point is higher than a pre-set threshold value, for example, all the attributes of the wireless access point may be submitted to a cloud end server, and the cloud end server performs further comprehensive analysis and determination on all the attributes of the wireless access point, for example; and if it is further determined that the wireless access point is at risk, then warning information for the wireless access point is provided to the user, so as to ensure that the warning information provided to the user is more reliable. In one embodiment, the description of the above-mentioned access point attribute information is merely exemplary, and the description of the other existing or the access point attribute information that may appear in the future should also be included in the scope of protection of the present application as applicable to the present application and are hereby incorporated by reference.

In summary, the present application involves obtaining an attribute operation by a user on a wireless access point and determining access point attribute information about the wireless access point according to the attribute operation, so that lots of accurate and reliable access point attribute information can be automatically accumulated based on an attribute operation submitted by UGC of a large number of users on a wireless access point, and then by determining the access point attribute information about the wireless access point according to the attribute operation, such as an acceptation/correction/complaint operation on an attribute of a access point, for further data mining or for reference by a user to be accessed to a wireless access point, without the work of collecting the access point attribute information offline in a labor-consuming and time-consuming manner, thereby constructing, without any costs, an accurate, comprehensive and valuable vast-hotpot-information library for big data mining, and enhancing the user experience using the data in a proper scenario.

Furthermore, in the present application, the access point attribute information about each wireless access point comprises various attributes of the wireless access point and a current weight value score corresponding to each of the attributes. The access point attribute information about each wireless access point can be quantified by means of the various attributes of the wireless access point and the current weight value score corresponding to each of the attributes, so that a user who queries wireless access points can more efficiently distinguish, according to the current weight value score corresponding to each of the attributes, whether the wireless access point is more or less preferred than the other wireless access points.

According to embodiments, various modifications and variations may be made to the present application by those skilled in the art, without departing from the spirit and the scope of the present application. In view of the foregoing, it is intended that the present application covers these modifications and variations provided that these modifications and variations made to the present application fall within the scope of the claims and their equivalents.

It needs to be noted that the present invention may be implemented in software and/or a combination of software and hardware, for example, an application-specific integrated circuit (ASIC), a general-purpose computer or any other similar hardware devices may be used for implementation. In one embodiment, the software program of the present invention may be executed by a processor to implement the steps or functions above. Likewise, the software program (comprising a relevant data structure) of the present invention may be stored in a computer readable recording medium, such as an RAM memory, a magnetic or optical driver or floppy disk and similar devices. In addition, some steps or functions in the present invention may be implemented by means of hardware, for example, a circuit in cooperation with a processor to execute various steps or functions.

Said prepreg may be cured by heating at high temperature and/or high pressure to form a cured film or a solid insulation layer and the solvent existed in the resin composition, if any, may evaporate during the heating at high temperature.

Moreover, a part of the present invention may be applied as a computer program product, for example, a computer program instruction that, when executed by a computer, can call or provide a method and/or technical solution according to the present invention by means of the operations of the computer. The program instruction which calls the method of the present invention may be stored in a fixed or removable recording medium, and/or transmitted by means of broadcast or data streams in other signal bearing media, and/or stored in a working memory of a computer device which runs according to the program instruction. Here, one embodiment of the present invention comprises a means, the means comprising a memory for storing a computer program instruction and a processor for executing the program instruction, and when the computer program instruction is executed by the processor, the means is triggered to run a method and/or technical solution based on a plurality of aforementioned embodiments according to the present invention.

For those skilled in the art, it is apparent that the present invention is not limited to the details of the above-mentioned exemplary embodiments, and the present invention can be implemented in other specific forms without departing the spirit or basic features of the present invention. Therefore, no matter from which point of view, the embodiments should all be regarded as exemplary and non-limiting. The scope of the present invention is defined by the appended claims rather than the above-mentioned description, and therefore it is intended that all changes which fall within the meaning and range of equivalency of the claims are embraced in the present invention. Any reference signs in the claims should not be construed as limiting the claims involved. In addition, it is apparent that the word "comprising" does not exclude other elements or steps, and the singular does not exclude the plural. A plurality of units or means stated in the device claims may also be implemented by one unit or means by means of software or hardware. The terms first and second and the like are used to represent names and do not represent any particular order.

What is claimed is:

1. A method for generating access point attribute information about a wireless access point, comprising:
   obtaining an attribute operation by a user on a wireless access point, wherein the attribute operation including the user submitting user generated content of the wireless access point, and wherein the user generated content of the wireless access point include access point provider information and access point availability information;
   determining access point attribute information about the wireless access point according to the attribute operation; and providing the determined access point attribute information to a user equipment to be accessed to the wireless access point, wherein the access point attribute information about each wireless access point comprises various attributes of the wireless access point and current weight value scores corresponding to the various attributes, respectively, and wherein determining access point attribute information about the wireless access point according to the attribute operation comprises:
   if the obtained attribute operation is a user submitting an attribute of the wireless access point that is negative information for an existing attribute of the wireless access point, subtracting a pre-set weight value score from a current weight value score of the existing attribute to act as a new current weight value score of the existing attribute.

2. The method as claimed in claim 1, wherein determining access point attribute information about the wireless access point according to the attribute operation comprises:
   if the obtained attribute operation is a user submitting a new attribute of the wireless access point, assigning a pre-set initial current weight value score to the new attribute.

3. The method as claimed in claim 1, wherein determining access point attribute information about the wireless access point according to the attribute operation comprises:
   if the obtained attribute operation is a user submitting an attribute of the wireless access point that is acceptation information for an existing attribute of the wireless access point, adding a pre-set weight value score to a current weight value score of the existing attribute information to act as a new current weight value score of the existing attribute.

4. The method as claimed in claim 1, wherein determining access point attribute information about the wireless access point according to the attribute operation comprises:
   if the obtained attribute operation is a user submitting an attribute of the wireless access point that is the same as an existing attribute of the wireless access point, adding a pre-set weight value score to a current weight value score of the existing attribute to act as a new current weight value score of the existing attribute.

5. The method as claimed in claim 1, wherein determining access point attribute information about the wireless access point according to the attribute operation comprises:
   determining the current weight value score of each attribute of the wireless access point according to user attribute data and the attribute operation.

6. The method as claimed in claim 5, wherein the user attribute data comprises one of or any combination of user credit data, a user contribution frequency and a user contribution degree.

7. The method as claimed in claim 1, further comprising, while providing the access point attribute information to a user equipment to be accessed to the wireless access point,
   if an attribute of the wireless access point is an attribute relating to security, and a current weight value score of the attribute relating to security is higher than a pre-set threshold value, analyzing all attributes of the wireless access point; and
   if the wireless access point is analyzed to be at risk, providing warning information for the wireless access point to the user.

8. The method as claimed in claim 1, further comprising, while providing the access point attribute information to a user equipment to be accessed to the wireless access point,
   if an attribute of the wireless access point is an attribute relating to security, and a current weight value score of the attribute relating to security is higher than a pre-set threshold value, analyzing all attributes of the wireless access point; and
   if the wireless access point is analyzed to be at risk, providing warning information for the wireless access point to the user.

9. A non-transitory computer-readable medium storing instructions, which when executed by one or more processors, cause an apparatus at least to:
   obtain an attribute operation by a user on a wireless access point, wherein the attribute operation including the user submitting user generated content of the wireless access point, and wherein the user generated content of the wireless access point include access point provider information and access point availability information;
   determine access point attribute information about the wireless access point according to the attribute operation; and
   providing the determined access point attribute information to a user equipment to be accessed to the wireless access point, wherein the access point attribute information about each wireless access point comprises various attributes of the wireless access point and current weight value scores corresponding to the various attributes, respectively, and wherein determining access point attribute information about the wireless access point according to the attribute operation comprises:

if the obtained attribute operation is a user submitting an attribute of the wireless access point that is negative information for an existing attribute of the wireless access point, subtracting a pre-set weight value score from a current weight value score of the existing attribute to act as a new current weight value score of the existing attribute.

10. An apparatus, comprising:

a memory; and one or more processors executing instructions stored in the memory to cause the apparatus to:

obtain an attribute operation by a user on a wireless access point, wherein the attribute operation including the user submitting user generated content of the wireless access point, and wherein the user generated content of the wireless access point include access point provider information and access point availability information;

determine access point attribute information about the wireless access point according to the attribute operation; and providing the determined access point attribute information to a user equipment to be accessed to the wireless access point, wherein the access point attribute information about each wireless access point comprises various attributes of the wireless access point and current weight value scores corresponding to the various attributes, respectively, and wherein determining access point attribute information about the wireless access point according to the attribute operation comprises:

if the obtained attribute operation is a user submitting an attribute of the wireless access point that is negative information for an existing attribute of the wireless access point, subtracting a pre-set weight value score from a current weight value score of the existing attribute to act as a new current weight value score of the existing attribute.

* * * * *

UNITED STATES PATENT AND TRADEMARK OFFICE
CERTIFICATE OF CORRECTION

PATENT NO. : 10,517,038 B2
APPLICATION NO. : 15/886846
DATED : December 24, 2019
INVENTOR(S) : Fayou Zhang and Yingjun Zhao It is certified that error appears in the above-identified patent and that said Letters Patent is hereby corrected as shown below:

In the Claims

Claim 7, please replace as follows:
7. The method as claimed in claim 1, further comprising, while providing the access point attribute information to a user equipment to be accessed to the wireless access point,
if an attribute of the wireless access point is an attribute relating to security, and a current weight value score of the attribute relating to security is higher than a pre-set threshold value, providing warning information for the wireless access point to the user.

Signed and Sealed this
Fourth Day of February, 2020

Andrei Iancu
*Director of the United States Patent and Trademark Office*